United States Patent [19]

Barens

[11] Patent Number: 5,065,638
[45] Date of Patent: Nov. 19, 1991

[54] VARIABLE RATIO TRANSMISSION

[76] Inventor: Ivor Barens, 401 Markham St., Toronto, Ontario M6G 2L1, Canada

[21] Appl. No.: 654,806

[22] Filed: Feb. 13, 1991

Related U.S. Application Data

[63] Continuation-in-part of Ser. No. 524,905, May 18, 1990, abandoned, which is a continuation-in-part of Ser. No. 382,431, Jul. 20, 1989, abandoned.

[51] Int. Cl.$^5$ .............................................. F16H 3/24
[52] U.S. Cl. ...................................................... 74/351
[58] Field of Search ........................................... 74/351

[56] References Cited

U.S. PATENT DOCUMENTS

| | | |
|---|---|---|
| 542,095 | 7/1895 | Muehleisen ............................ 74/351 |
| 619,551 | 2/1899 | Ferris ..................................... 74/351 |
| 684,215 | 10/1901 | Foster ..................................... 74/351 |
| 715,404 | 12/1902 | Markgraf ............................... 74/351 |
| 955,279 | 4/1910 | Moore .................................... 74/351 |
| 2,473,545 | 6/1949 | Reid ....................................... 74/351 |
| 3,075,397 | 1/1963 | Winter .................................... 74/351 |
| 3,912,039 | 10/1975 | Ordemann ........................... 74/33 D |
| 4,447,068 | 5/1984 | Brooks .............................. 74/351 X |
| 4,813,302 | 3/1989 | Davidow ................................ 74/351 |

FOREIGN PATENT DOCUMENTS

| | | | |
|---|---|---|---|
| 405622 | 1/1910 | France | 74/351 |
| 570344 | 1/1924 | France | 24/351 |
| 335578 | 2/1936 | Italy | 74/351 |

*Primary Examiner*—Dwight Diehl
*Attorney, Agent, or Firm*—Smart & Biggar

[57] ABSTRACT

A variable ratio transmission comprises a pinion with spring loaded pins mounted on a face gear which is a disc with one of the plate-like surfaces containing a plurality of grooves separated by crowns extending from the periphery of the disc. At intermittent radii on the face gear, the pins of the pinion mesh with every other groove of the face gear and missed grooves at one intermittent radius are the meshing grooves of an adjacent radius so that the number of meshing radii are increased compared with dimensioning the face gear so that the pins of the pinion mesh with every groove of the face gear at intermittent radii. The tops of the crowns, at least between meshing radii, are tapered to provide bearing surfaces which reduce wear and friction.

10 Claims, 5 Drawing Sheets

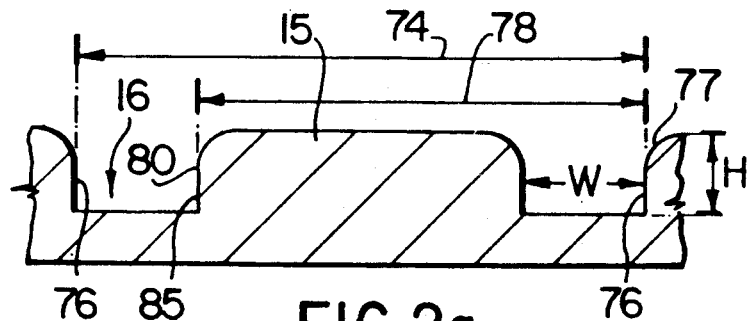
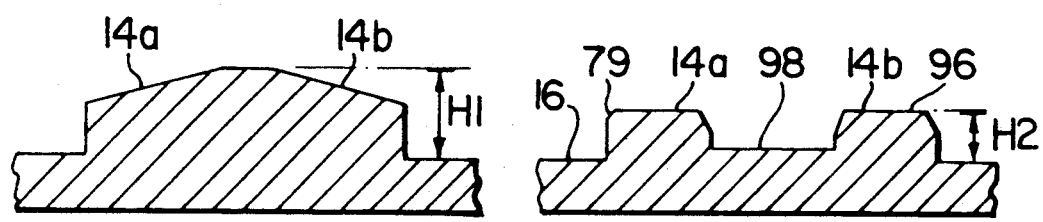
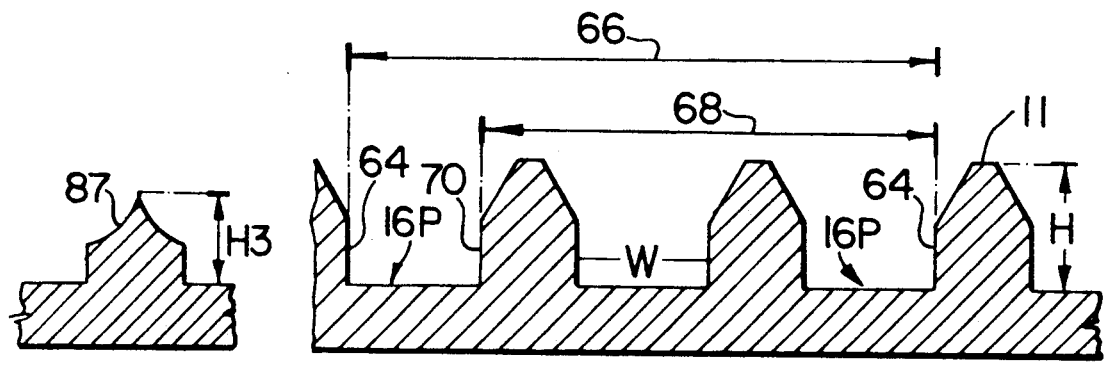
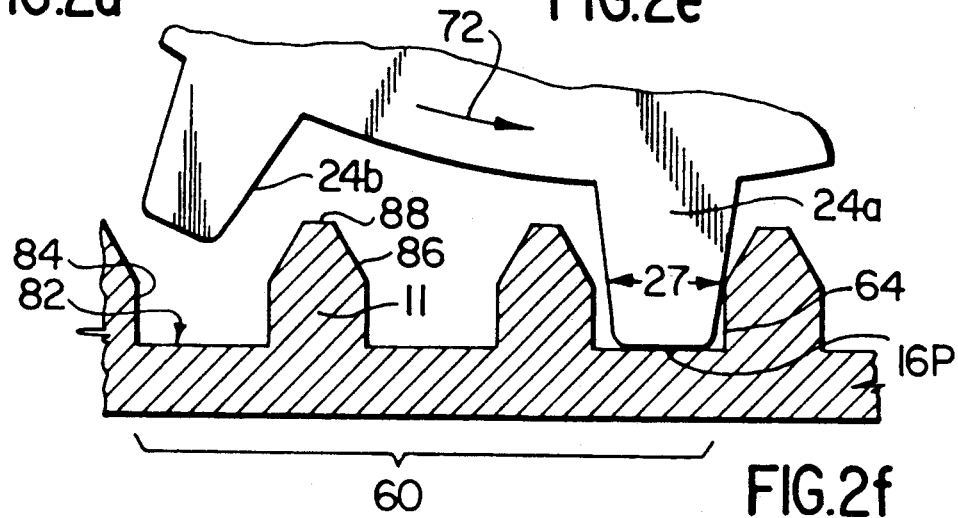

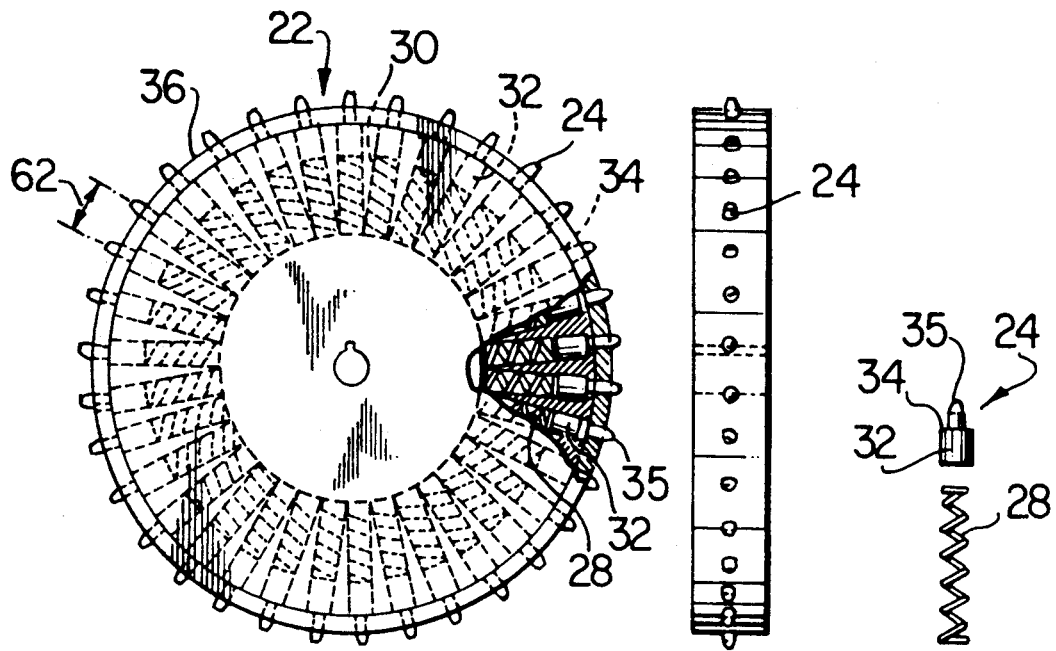
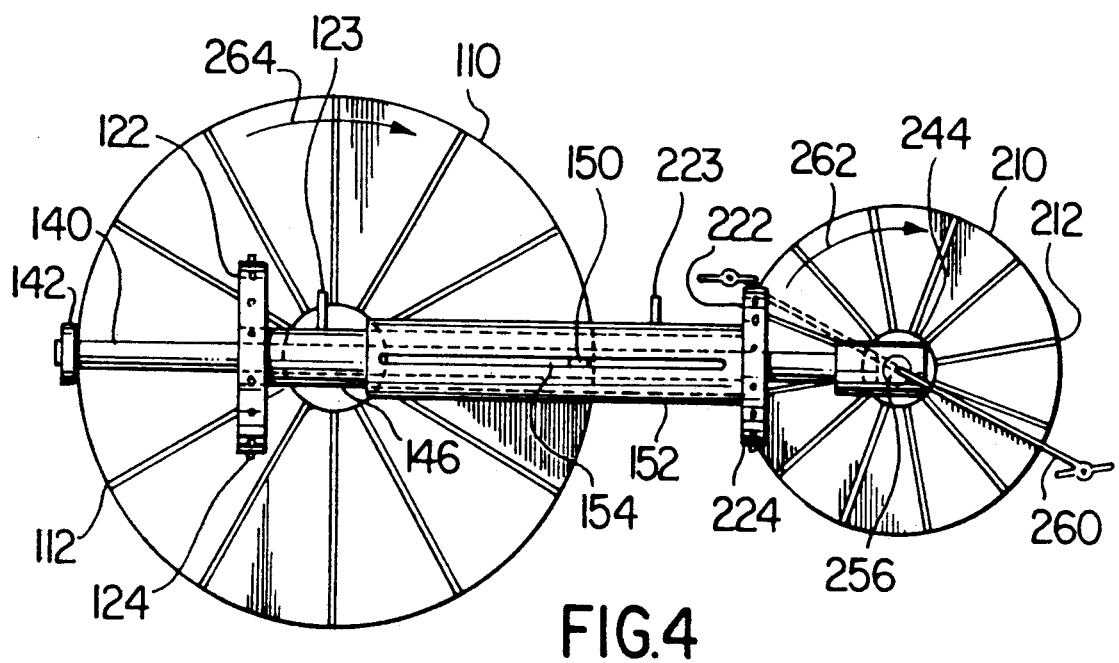

VARIABLE RATIO TRANSMISSION

RELATED APPLICATIONS

This application is a Continuation-in-part of U.S. patent application Ser. No. 07/524,905 filed May 18, 1990, which is a continuation-in-part of U.S. patent application Ser. No. 07/382,431 filed July 20, 1989, now abandoned.

BACKGROUND OF INVENTION

This invention relates to a variable ratio transmission.

Prior Art

Multiple speed transmission mechanisms are well-known. For example U.S. Pat. No. 3,075,397 dated Jan. 29, 1963 to Winter discloses a multiple speed gear transmission comprising two gears. The first gear, which may be called a "face gear", is a disc-like plate with a surface which is divided into sectors. Each sector has one radial groove and a plurality of equally spaced parallel grooves to each side of the radial groove. The second gear is a pinion having a plurality of peg-like teeth rigidly affixed thereto. With this arrangement, the pinion will mesh with the face gear at certain discrete radii, and Winter provides a lead screw threadedly coupled to a pinion mounting block to move the pinion to these discrete radii.

SUMMARY OF THE INVENTION

This invention seeks to overcome drawbacks of known variable ratio transmission mechanisms.

Accordingly, there is provided a variable ratio transmission comprising: a pinion having a plurality of pins equally spaced about its periphery, each of said plurality of pins having urging means to urge each said pin to an extended position and being depressible against said urging means to a depressed position; a face gear comprising a plate rotatable about a centre of rotation and having a surface comprising a plurality of fingerlike crowns extending inwardly from the periphery of said plate forming grooves between adjacent crowns such that at intermittent radii from said centre of rotation, for any one of said grooves, there is another one of said grooves such that the arc distance between said one and said other of said grooves is approximately equal to the arc distance between adjacent pins of said pinion, said grooves having a width greater than the width of the portion of said pins entering said grooves, and such that at least some of said one and said other of said grooves are not adjacent grooves; means mounting said pinion for rotation on said face gear and permitting said pinion to be translated radially along said face gear; whereby said plurality of pins of said pinion, when in said extended position, may mesh with said grooves of said face gear so that when said pinion is positioned at one of said intermittent radii and said face gear and pinion rotate, said plurality of pins mesh with ones of said grooves and such that, when said pinion is positioned at other than one of said intermittent radii, any of said plurality of pins which do not mesh with said grooves may be depressed by a crown toward said depressed position to permit continued rotation of said pinion and face gear without jamming.

BRIEF DESCRIPTION OF THE DRAWINGS

In the figures which illustrate example embodiments of the invention: FIG. 2a is a sectional view along the line 2A-2A of FIG. 2; FIG. 2b is a sectional view along the line 2B-2B of FIG. 2; FIG. 2c is a sectional view along the line 2C-2C of FIG. 2; FIG. 2d is a sectional view along the line 2D-2D of FIG. 2; FIG. 2e and 2f are sectional views of the gears of the variable ratio transmission; FIG. 3a is a side view of the second gear of FIG. 1; FIG. 3b is a plan view of the gear of FIG. 1; FIG. 3c is an exploded view of a portion of the gear of FIGS. 3a and 3b; FIG. 4 illustrates the drive train of a bicycle made in accordance with this invention.

DETAILED DESCRIPTION OF THE PREFERRED EMBODIMENTS

Figure 1:
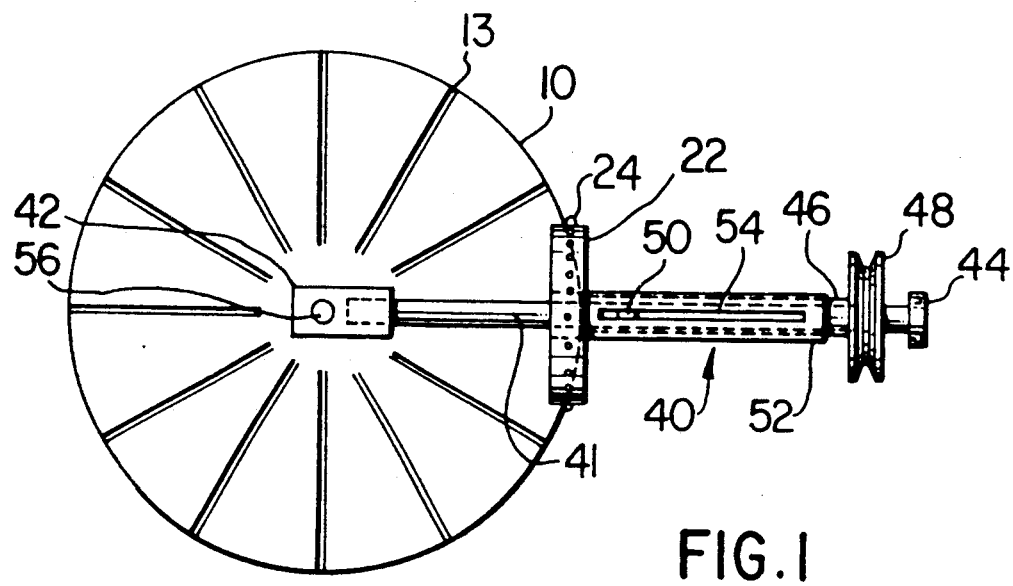
FIG. 1 is a schematic plan view of a variable speed transmission constructed in accordance with this invention.

Referring to FIG. 1, a variable ratio transmission of this invention comprises a face gear 10, a pinion 22, and a mounting means 40 for mounting the pinion on the face gear.

Turning to FIGS. 3a, 3b, and 3c, pinion 22 has a plurality of spring-loaded pins 24 equally spaced about its periphery. More particularly, for each pin 24, a spring 28 received within a well 30 extends between the base of the well and the enlarged base 32 of pin 24 in order to urge the pin radially outwardly to an extended position whereat the shoulder 34 of the pin abuts a pin retaining collar 36. In this position, the head 35 of the pin projects beyond the well 30 and retaining collar 36. The distance between the heads of adjacent pins is shown at 62. More precisely, distance 62 is measured along the arcuate path of travel of the pin heads.

Figure 2:
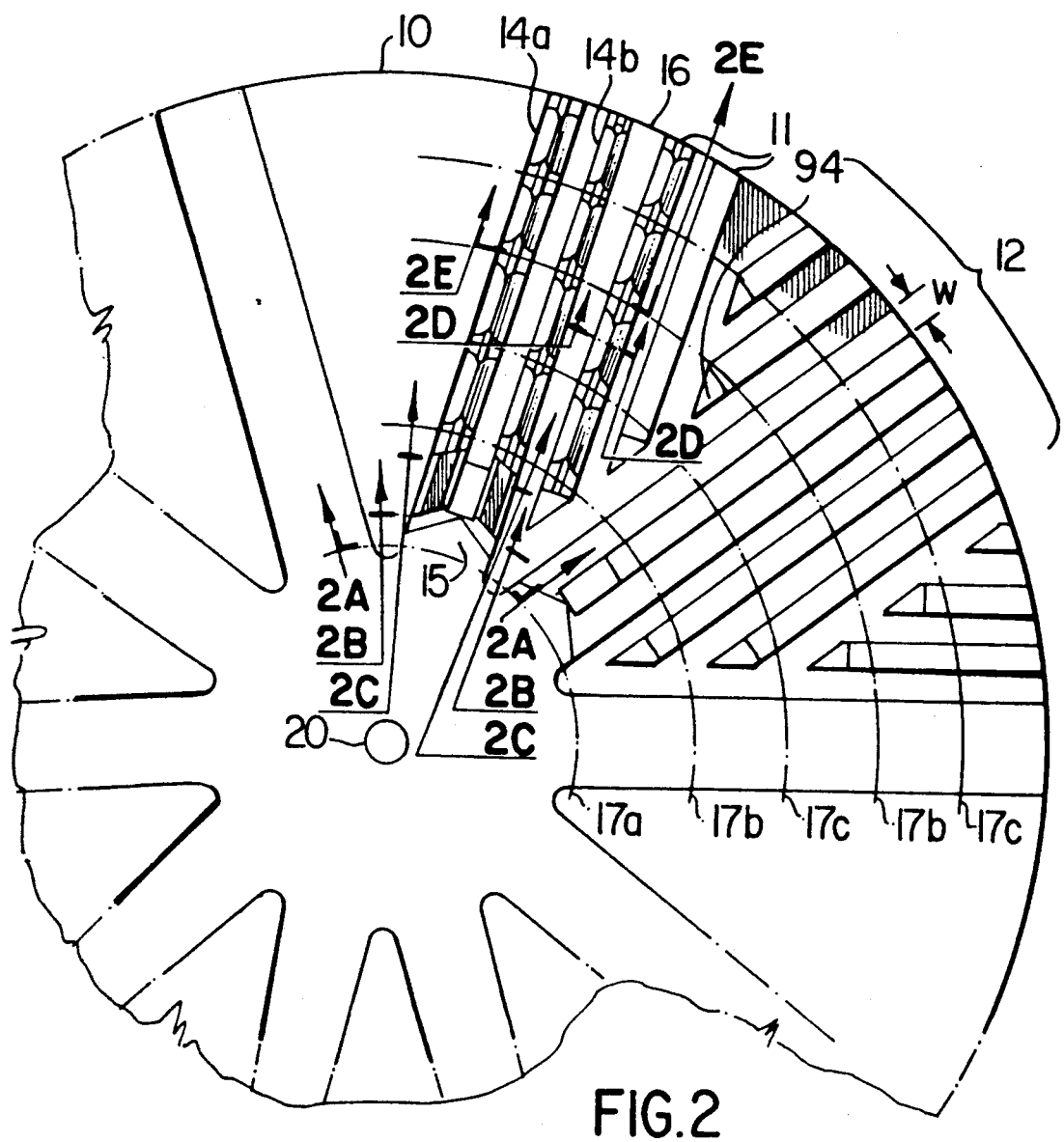
FIG. 2 is a plan view of one of the gears of FIG. 1.

Turning to FIG. 2, face gear 10 comprises a disc-like plate rotatable about a centre of rotation 20. One surface of the face gear contains a series of finger-like crowns 11 which extend inwardly from the periphery of the disc-like plate. The crowns are arranged so as to form sectors 12 of parallel crowns. Each sector includes a pair of adjacent crowns 14a, 14b extending generally radially inwardly and joined at their inner ends to form an increased width crown segment 15. Grooves 16 are formed between adjacent crowns 11 and adjacent crown segments 15. Each groove has a width W, at least at certain intermittent radii indicated at 17a, 17b, 17c, 17d, and 17e from the centre of rotation 20 of the disc. Width W is slightly greater than the widest portion of the pins 24 which is received within the grooves (seen at 27 in FIG. 2f). The layout of the grooves is such that at the intermittent radii 17b, 17c, 17d, and 17e, the arc distance (i.e., distance along a circumferential line) between the midpoints of every other groove is nominally equal to the distance 62 between heads of adjacent pins 24 of pinion 22. Furthermore, the layout of the grooves is such that at the intermittent radius 17a, the arc distance between adjacent grooves is nominally equal to the distance 62 between adjacent pin heads. This design allows the pinion to fully mesh with the face gear at the intermittent radii, as will be further described hereinafter; accordingly, the intermittent radii are sometimes referred to herein as meshing radii.

The groove design at the meshing radius 17a is illustrated in FIG. 2A. With reference to FIG. 2A, the arc distance 74 between the distal sides 76 of the adjacent crown segment grooves 16 is at least as great as the distance 62 (seen in FIG. 3) between adjacent pin heads plus the width of the widest portion of the pin received within the grooves (seen at 27 in FIG. 2f); additionally, the arc distance 78 between the distal side 76 of one of two adjacent crown segment grooves and the adjacent side 80 of the adjacent crown segment groove is no greater than the distance 62 between adjacent pin heads. Thus, at meshing radius 17a, adjacent pins of the pinion will engage adjacent crown segment grooves 16. The upper corners 77 of the crown segments are tapered in order to form bearing surfaces, as will be explained more fully hereinafter. The crown segments 15 have a height H.

As seen in FIGS. 2B and 2C, between meshing radius 17a and meshing radius 17b, a medial radial slope 98 forms in the crown segments 15 which divides the crown segments into the generally radial crowns 14a, 14b. Furthermore, between the two meshing radii the height of the crowns 14a, 14b reduces from H to H2 at zone 90 (seen in FIG. 2) and the top of the crowns 14a, 14b are planar in zone 90. The reason for this is as follows, near the centre of rotation 20, the angle of the pinion with respect to any given groove 16 changes significantly with a small rotation of the gears. This causes the pins of pinion on either side of the pin directly on the face gear to sweep across a portion of the face of the face gear as the pinion rotates. These sweeping pins would bind on the crowns were it not for their reduced height H2 and planar surface at zone 90 between the first and second meshing radius. This problem is not as pronounced beyond the second meshing radius 17b since the angle change between the pinion and any given groove as the gears rotate is smaller. Again the upper corners 79 of the crowns 14a, 14b are bevelled in order to form bearing surfaces, as will be explained more fully hereinafter.

The groove design at one of the intermittent radii 17b through 17e is detailed in FIGS. 2E and 2F. With reference to these figures, any group 60 of three adjacent grooves is such that the arc distance 66 between the outside sides 64 of the peripheral grooves 16p of the group 60 is at least as great as the distance 62 (shown in FIG. 3A) between adjacent pin heads plus the width of the widest portion of the pin received within the grooves (seen at 27 in FIG. 2F) and the arc distance 68 between the outside side 64 of one of the peripheral grooves 16p of the group and the inside side 70 of the other peripheral groove 16p is no greater than the distance 62 between adjacent pins. FIG. 2F shows the pinion 22 rotating in a counterclockwise direction 72 with a pin 24a in the first encountered peripheral groove 16p of a group 60 of grooves at one of the meshing radii 17b through 17e. Pin 24a will thrust against outside side 64 of the peripheral groove, however, since the distance 62 between pins is intermediate of arcuate distances 66 and 68, the adjacent advancing pin 24b of the pinion will engage in the other peripheral groove 16p of the group. In the result, intermittent radii 17b through 17e are radii at which adjacent pins of pinion 22 engage with every other groove of the face gear. The top portion 86 of the crowns taper toward their top surface 88. The taper of the top portion of the crown is linear in the vicinity of these intermittent radii.

FIG. 2D is a cross-section of a crown between any of intermittent radii 17b through 17e. The crowns between these meshing radii have a height H3 which is less than the height H of the crowns at the meshing radii. This reduced height assists in the prevention of binding for the same reason as described in connection with FIGS. 2B and 2C hereinbefore. The taper 87 of the top portion of the crown is concave between meshing radii 17b through 17e, again to assist in the prevention of binding as will be described hereinafter.

As seen in FIGS. 2A through 2F, the basal surface (82 in FIG. 2F) of the grooves 16 is planar and the sides 84 (see FIG. 2F) of the crowns 11 and sides 85 see FIG. 2A) of the crown segments proximate the grooves are planar and perpendicular to the basal surface of the grooves. This ensures a pin meshing in a groove 16 may firmly plant on the bottom of the groove and has an adequate thrusting surface which avoids the possibility of the planted pin sliding over the top of the groove. The tapered top portion of the crowns extends substantially the length of the crowns.

Returning to FIG. 2, the crowns 11 (other than the generally radial crowns 14a, 14b) terminate at their inner end in slopes 94 which slope down to the basal surface of the grooves 16; this eliminates a sharp step at the end of these crowns which could cause jamming.

Returning to FIG. 1, a fixed shaft 41 is supported at either end by mounting blocks 42 and 44. The fixed shaft 41 receives a tubular input/output shaft 46 which is free to rotate on the fixed shaft but is restrained from axial movement. Tubular shaft 46 has a pulley 48 fixed to one end. Tubular shaft 46 also supports a lug 50. Pinion 22 is fixed at one end of tubular shaft 52 which telescopes over tubular input/output shaft 46. Tubular shaft 52 has a keyway 54 which receives lug 50. This arrangement allows for shaft 52 to move axially relative to tubular input/output shaft 46 while torque is transmitted between input/output shaft 46 and shaft 52.

Mounting block 42 supports axle 56 of face gear 10. The axle runs through the centre of rotation 20 of the face gear. The arrangement is such that pinion 22 and face gear 10 are orientated at right angles, with the pins 24 of pinion 22 capable of meshing with the grooves of face gear 10. Furthermore, the mounting block terminates just inside the first intermittent radius 17a of the face gear.

In operation, rotation of pulley 48 is imparted to pinion 22 through shafts 46 and 52. Pinion 22 may be slid to different radial positions on face gear 10 by axially sliding shaft 52 on tubular shaft 46 either while the gears are stationary or rotating. It will be apparent pinion 22 may be moved to any radial position on face gear 10 between the periphery of the face gear and mounting block 42. However, if the pinion is positioned at one of the intermittent radii 17a, 17b, 17c, 17d, 17e on the face gear, then due to the aforedescribed dimensions of the gears, each pin of the pinion will mesh with a groove of the face gear as the pinion rotates. Between the intermittent radii, the dimensions of the gears are not such as to ensure meshing of each pin of the pinion, consequently, some of the pins 24 will not mesh with a groove but will instead contact the top portion of a crown 11 or a crown segment 15 and will be depressed into wells 30 contained in the body of pinion 22. The likelihood of jamming of the gears is reduced by virtue of the fact non-meshing pins are depressed into their wells. Furthermore, the top portions of the crowns 11 and crown segments are tapered. These tapers act as bearing surfaces. That is, when an advancing pin hits a crown, it rubs on the crown until the pin rotates away from the face gear; this rubbing results in a frictional binding force which reduces the efficiency of the gears and increases wear. Frictional drag due to binding is a particular problem where the pinion is moved on the face gear (in order to change the transmission ratio of the gears) under load; the bearing surfaces reduce binding forces and hence enhance efficiency and reduce wear, especially under load.

It has been observed that when the pinion 22 is moved from any one of the meshing radii 17b through 17e to an adjacent meshing radius 17b through 17e, the pins shift so that the grooves which were missed at the former meshing radii are now engaged by pins. Similarly, when the pinion moves to meshing radius 17b from meshing radius 17a (at which the pins mesh with the grooves between each crown segment), the pins shift such that they engage the grooves between the generally radial crowns 14a, 14b. The realisation of this operation permits the construction of a face gear with a greater number of meshing radii than would be possible should the gears be designed such that at all meshing radii adjacent pins of the pinion engaged adjacent grooves of the face gear.

It is of course contemplated that face gear 10 could be the driving gear, in which case tubular shaft 46 would be an output shaft.

FIG. 4 illustrates the drive train of a bicycle with a variable transmission ratio made in accordance with this invention. Face gears 110 and 210 are each of the same design as face gear 10 of FIG. 2. Pinions 122 and 222 are each of the same design as pinion 22 illustrated in FIGS. 3a and 3b. Fixed shaft 140 is supported at either end by mounting blocks 142 and 244. Tubular input shaft 146 is slidably supported along fixed shaft 140 and has pinion 122 mounted to one end thereof. Lug 150 projects from tubular shaft 146. Pinion 222 is mounted at one end of tubular shaft 152 which telescopes over tubular shaft 146. Tubular shaft 152 has a keyway 154 which receives lug 150. Mounting block 244 receives axle 256 of face gear 210.

The arrangement is such that pinions 122 and 222 are orientated at right angles to face gears 110 and 210 respectively with pins 124 and 224 capable of meshing with the grooves 112 and 212 respectively. Handles 123 and 223 are provided in order to move pinions 124 and 224 radially relative to face gears 110 and 210. A conventional pedal crankshaft assembly 260 is mounted to axle 256 to impart torque to face gear 210. Face gear 110 is mounted to a driven bicycle wheel.

In operation, torque imparted to pedal crankshaft assembly 260 is transmitted to face gear 210 which drives pinion 222. Rotation of pinion 222 results in rotation of pinion 122, and results in rotation of face gear 110. Rotation of face gear 210 in a clockwise direction illustrated at 262 drives face gear 110 in the same direction, illustrated at 264. Pinions 122 and 222 may be positioned at different meshing radii on their respective face gears 110 and 210, respectively, by moving shafts 146 and 152 relative to shaft 140 by utilizing handles 123 and 223.

Figure 5:
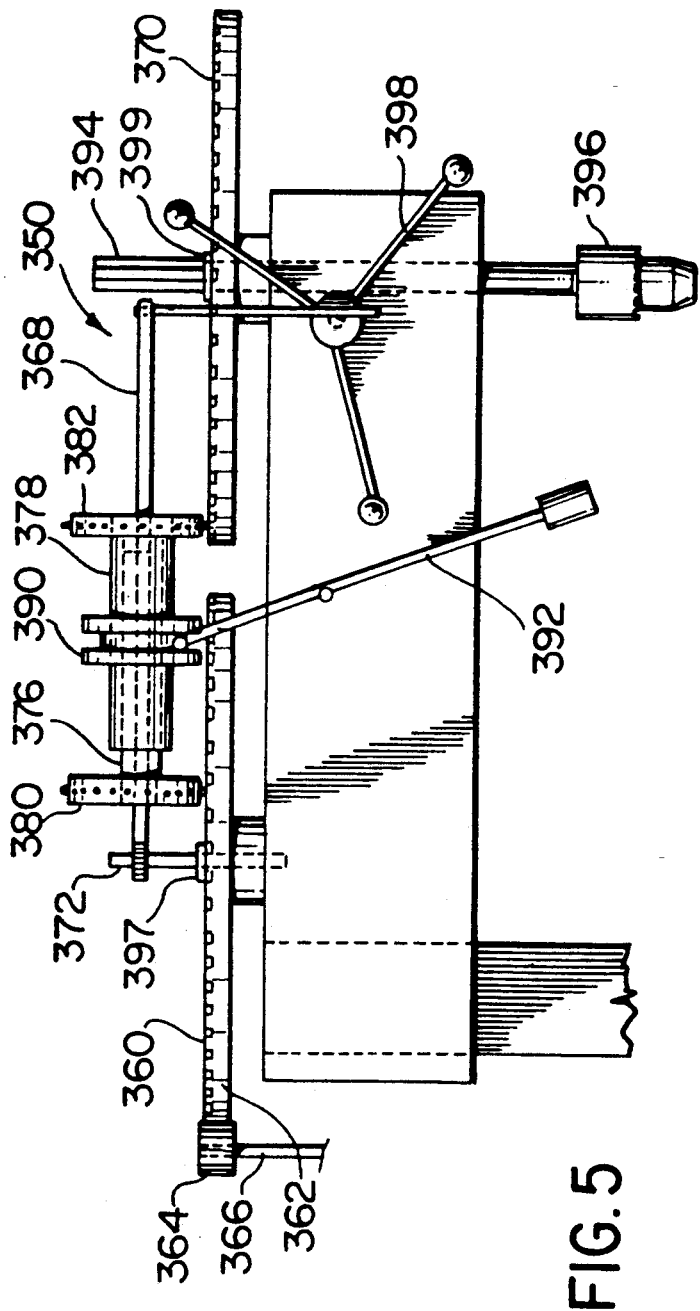
FIG. 5 is a side view of a drill press made in accordance with this invention.
Figure 5A:
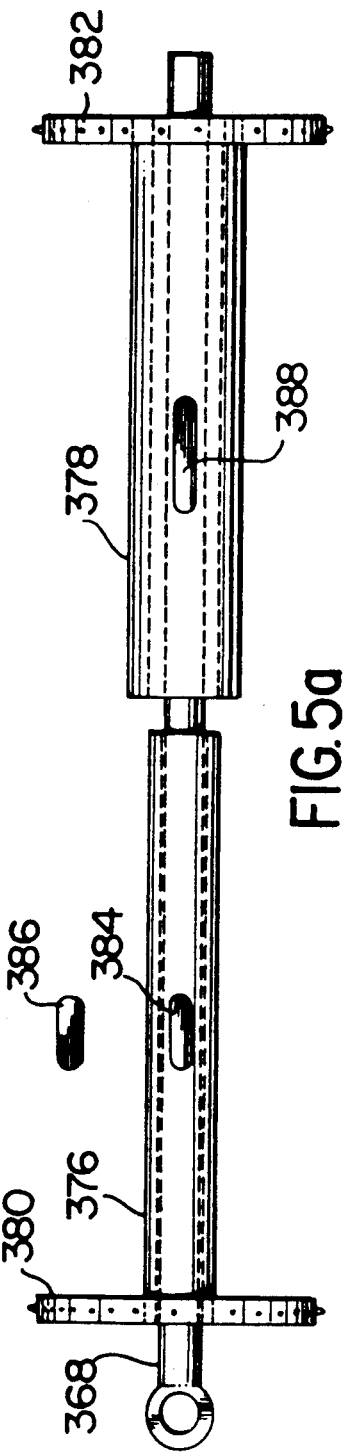
FIG. 5a is an exploded view of a portion of FIG. 5.

FIG. 5 is a simplified side view of a drill press 350 made in accordance with this invention. A base 352 rotatably supports two face gears 360 and 370 of the type shown in FIG. 2. Face gear 360 also has a toothed periphery 362 so that this face gear is also a spur gear. The toothed periphery of face gear 360 meshes with spur gear 364 and the spur gear 364 is connected to a motor (not shown) via shaft 366. A fixed shaft 368 is mounted over the face gears by supports 372 and 374. The fixed shaft supports a tubular pinion mounting shaft 376 to which a pinion 380 of the type shown in FIG. 3 is mounted. The pinion mounting shaft is free for rotation and translation along the fixed shaft 368. A second tubular pinion mounting shaft 378 is telescopically mounted to pinion mounting shaft 376. As seen in FIG. 5a, pinion mounting shaft 376 has a key receptor 384 and pinion mounting shaft 378 has a short keyway 388. With pinion mounting shaft 378 is telescoped over pinion mounting shaft 376 so that the keyway 388 is over the key receptor 384, key 386 may be received by the key receptor 384. This assembly is maintained in place by ring 390 which may be fixed to pinion mounting shaft 378 over keyway 388 by means of a set screw (not shown). The positioning of the fixed shaft is such that the pinions 380 and 382 are at right angles to, and in meshing relation with, the face gears 360 and 370, respectively. A handle 392 affixed at one end to ring 390 may be used to move the pinions to different radii on their respective face gears.

The hub of face gear 370 is hexagonal in cross-section and receives a hexagonal end of shaft 394 which terminates at its other end in chuck 396 of the drill press. A rotatable handle structure 398 is connected by conventional means to control the vertical positioning of the drill chuck 396.

In operation, torque applied to spur gear 364 by the motor (not shown) of the drill press is imparted to chuck 396 through face gear 360, pinion 380, shaft 376, shaft 378, pinion 382, face gear 370 and shaft 394. The speed of the chuck may be controlled by manipulating the position of pinions 380 and 382 on their respective face gears 360 and 370 by means of handle 392. More particularly, the speed of the chuck will be slow when pinion 380 is at a meshing radius proximate the hub 397 of face gear 360 and pinion 382 is at a meshing radius proximate the periphery of face gear 370 (as is illustrated in FIG. 5) and the speed of the chuck will be fast when the pinion 380 is at a meshing radius near the periphery of face gear 360 and the pinion 382 is at a meshing radius near the hub 399 of face gear 370.

The short keyway 388 permits limited axial movement of pinion mounting shaft 376 with respect to pinion mounting shaft 378. Accordingly, when handle 392 is moved in order to reposition pinion 380 or 382 from one meshing radii to another meshing radii on its respective face gear, the limited relative axial freedom of the pinion mounting shafts 376 and 378 permits the other of pinions 380 and 382 to find a meshing radii on its face gear.

FIG. 5a illustrates a modification of the drill press wherein the two keyed pinion mounting shafts 376 and 378 of FIG. 5 have been replaced by a single pinion mounting shaft 400 fixedly supporting both pinions 380 and 382. While this embodiment of the drill press will not normally function as well as the embodiment shown in FIG. 5 it is nevertheless a workable embodiment of the drill press.

Figure 6:
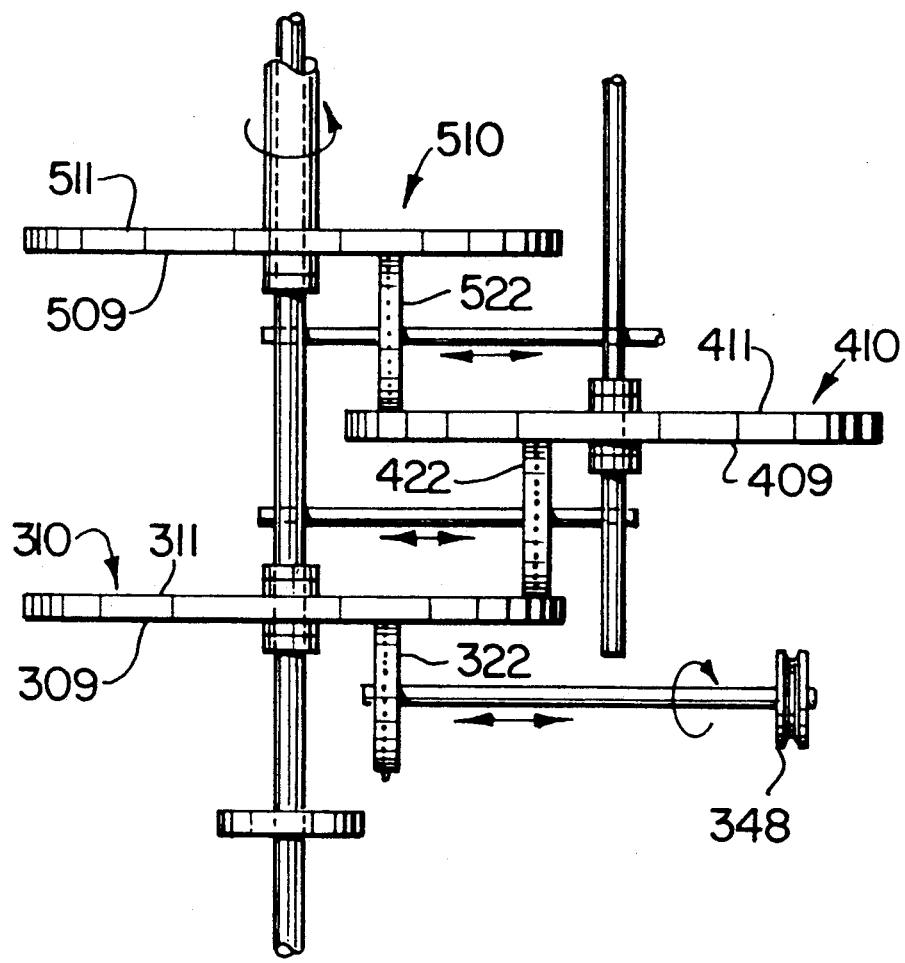
FIG. 6 is a schematic view of a multi-geared transmission made in accordance with this invention.

FIG. 6 schematically illustrates an embodiment of the invention which increases the range of available transmission ratios. In the FIG. 6 embodiment, the face gears 310, 410 and 510 are disc-like plates with opposite surfaces 309, 311; 409, 411 and 509, 511 being surfaces containing the pattern of grooves illustrated in FIG. 2. A pinion gear 322 is mounted in meshing relation with surface 309 of face gear 310 and is mounted for reception of torque from pulley 348. A pinion gear 422 is mounted between face gears 310 and 410 in meshing relation with surfaces 311 and 409 of these face gears and a pinion 522 is mounted between face gears 410 and 510 in meshing relation with surfaces 411 and 509 of these face gears.

With this arrangement, torque on pulley 348 is imparted to pinion 322 and is transmitted to face gear 310, to pinion 422, to face gear 410, to pinion 522 and to face gear 510. By adjusting the radial position of each of pinions 322, 422 and 522 with respect to the face gears with which they are in meshing relation, the transmission ratio may be varied over a wide range.

It is contemplated that the telescoping pinion drive utilising a key receptor for a drop-in key could be replaced with a spline arrangement. This invention has been described in terms of a few preferred embodiments and it is contemplated that persons reading the preceding descriptions and studying the illustrations will realize various alterations, permutations and modifications thereof.

What is claimed is:

1. A variable ratio transmission comprising:
   (a) a pinion having a plurality of pins equally spaced about its periphery, each of said plurality of pins having urging means to urge each said pin to an extended position and being depressible against said urging means to a depressed position;
   (b) a face gear comprising a plate rotatable about a centre of rotation and having a surface comprising a plurality of fingerlike crowns extending inwardly from the periphery of said plate forming grooves between adjacent crowns such that at intermittent radii from said centre of rotation, for any one of said grooves, there is another one of said grooves such that the arc distance between said one and said other of said grooves is approximately equal to the arc distance between adjacent pins of said pinion, said grooves having a width greater than the width of the portion of said pins entering said grooves, and such that at least some of said one and said other of said grooves are not adjacent grooves;
   (c) means mounting said pinion for rotation on said face gear and permitting said pinion to be translated radially along said face gear;
   whereby said plurality of pins of said pinion, when in said extended position, may mesh with said grooves of said face gear so that when said pinion is positioned at one of said intermittent radii and said face gear and pinion rotate, said plurality of pins mesh with ones of said grooves and such that, when said pinion is positioned at other than one of said intermittent radii, any of said plurality of pins which do not mesh with said grooves may be depressed by a crown toward said depressed position to permit continued rotation of said pinion and face gear without jamming.

2. The variable ratio transmission of claim 1 wherein for at least some of said intermittent radii, said one and said other of said grooves are the peripheral grooves in a group of three adjacent grooves.

3. The variable ratio transmission of claim 1 wherein the basal surface of said grooves are generally planar and wherein the sides of said crowns proximate said grooves are generally planar and perpendicular to said basal surface of said grooves and wherein the top portion of said crowns, along at least the majority of their length, tapers, the tapered top portion of said crowns forming bearing surfaces which reduce binding forces of pins rubbing against said crowns.

4. The variable ratio transmission of claim 3 wherein said tapered portion of said crowns proximate said intermittent radii has planar sides and wherein said tapered portion of said crowns between said intermittent radii has concave sides.

5. A variable ratio transmission comprising:
   (a) a pinion having a plurality of pins equally spaced about its periphery, each of said plurality of pins having urging means to urge each said pin to an extended position and being depressible against said urging means to a depressed position;
   (b) a face gear comprising a plate rotatable about a centre of rotation and having a surface comprising a plurality of fingerlike crowns extending inwardly from the periphery of said plate forming grooves between adjacent crowns;
   (c) means mounting said pinion for rotation on said face gear and permitting said pinion to be translated radially along said face gear; said face gear dimensioned such that at intermittent radii from said centre of rotation, the width of said grooves and the arc distance between every other of said grooves is such that adjacent pins of said pinion mesh in every other groove of said face gear,
   whereby said plurality of pins of said pinion, when in said extended position, may mesh with said grooves of said face gear so that when said pinion is positioned at one of said intermittent radii and said face gear and pinion rotate, said plurality of pins mesh with every other of said grooves and such that, when said pinion is positioned at other than one of said intermittent radii, any of said plurality of pins which do not mesh with said grooves may be depressed by a crown toward said depressed position to permit continued rotation of said pinion and face gear without jamming.

6. The variable ratio transmission of claim 5 wherein the basal surface of said grooves are generally planar and wherein the sides of said crowns proximate said grooves are generally planar and perpendicular to said grooves and wherein, along at least the majority of their length, the top portion of said crowns tapers, said taper forming bearing surfaces which reduce binding forces of pins rubbing against said crowns.

7. The variable ratio transmission of claim 6 wherein the tapered portion of said crowns proximate said intermittent radii has planar sides and wherein the tapered portion of said crowns between said intermittent radii has concave sides.

8. A variable ratio transmission comprising:
   (a) a pinion having a plurality of pins equally spaced about its periphery, each of said plurality of pins having urging means to urge each said pin to an extended position and being depressible against said urging means to a depressed position;
   (b) a face gear comprising a plate rotatable about a centre of rotation and having a surface comprising a plurality of fingerlike crowns extending inwardly from the periphery of said plate, said crowns forming sectors of parallel crowns, each sector including a pair of adjacent crowns extending generally radially inwardly and joined together proximate their inner ends to form an increased width crown segment, said crowns and crown segments forming grooves between adjacent crowns and crown segments, respectively;
   (c) means mounting said pinion for rotation on said face gear and permitting said pinion to be translated radially along said face gear;
   said face gear dimensioned such that at a radius intersecting said increased width crown segments, the width of said grooves and the arc distance between adjacent ones of said grooves is such that adjacent pins of said pinion mesh in every groove of said face gear at said radius intersecting said increased width crown segments and such that at intermittent radii from said centre of rotation beyond said crown segments the width of said grooves and the arc distance between every other of said grooves is such that adjacent pins of said pinion mesh in every other groove of said face gear at said intermittent radii;

whereby said plurality of pins of said pinion, when in said extended position, may mesh with said grooves of said face gear so that when said pinion is positioned at one of said intermittent radii or said radii intersecting said crown segments and said face gear and pinion rotate, said plurality of pins mesh with said grooves and thereby transmit torque between said face gear and pinion, and such that, when said pinion is positioned at other than one of said intermittent radii, any of said plurality of pins which do not mesh with said grooves may be depressed by a crown toward said depressed position to permit continued rotation of said pinion and face gear without jamming.

9. The variable ratio transmission of claim 8 wherein the basal surface of said grooves are generally planar and wherein the sides of said crowns proximate said grooves are generally planar and perpendicular to said grooves and wherein, along at least the majority of their length, the top portion of said crowns taper toward the top surface of said crowns, said taper forming bearing surfaces which reduce binding forces of pins rubbing against said crowns.

10. The variable ratio transmission of claim 9 wherein the tapered portion of said crowns proximate said intermittent radii has planar sides and wherein the tapered portion of said crowns between said intermittent radii has concave sides.

* * * * *